3,336,134
FOAM MATERIAL
John Frederick Kulp, Malvern, Pa., and Max F. Grandey, Hamilton, Ohio, assignors to General Electric Company, a corporation of New York
No Drawing. Original application Dec. 14, 1960, Ser. No. 75,673. Divided and this application Feb. 20, 1964, Ser. No. 352,412
3 Claims. (Cl. 75—208)

This is a division of application Ser. No. 75,673, now abandoned, filed Dec. 14, 1960, for Foam Material, and assigned to the same assignee as this invention.

This invention relates to a foam material, and more particularly, to a metal foam of interbonded laminae and method for making same.

The potential applications of foamed or porous materials will in many cases, be dependent upon density and erosion resistance. Thermal conductivity is another major consideration. Foamed or porous materials have been found to be useful as thermal insulators, high frequency sound attenuation media, filters and controls barriers for gases, vapors and liquids as well as oil retaining bearing materials or in light weight nonstructural applications. One specific application is as one part of a rubbing seal between rotating parts of gas turbine engines and similar power units. Prior to this invention, designers of such equipment when specifying metal foams have had to select densities which satisfy requirements at the working surface, such as the inner face of a seal, without regard to the overall density of the inner body of the seal. Designers of flight propulsion apparatus, always seeking lighter weight materials, would prefer to select a metal foam which would have higher density at the working surface but lower density in the body of the article.

Therefore, it is the principal object of this invention to provide a foam material of a plurality of interbonded laminae the interface betwen the laminations of which have been interfoamed.

Another object is to provide a method for making a metal foam of interbonded laminae.

These and other objects and advantages will be more readily understood from the following detailed description and the examples which are meant to be illustrations of rather than limitations on this invention.

Briefly stated, this invention in one form broadly comprises, in a method of making a foam material of interbonded laminae, the steps of foaming a mixture of a foamable resin and a metal, metal alloy or metal compound powder to produce a first foamed resin-powder material, heat bonding to the first foamed resin-powder material a second resin-metal foam material to form an interbonded laminated resin-powder foam, and then heating the laminated material above the decomposition temperature of the resins in the laminated foam to remove all organic materials, to bond the powders together and to further interbond the laminae into a continuous foamed material.

In a more specifically preferred form, the method of this invetnion comprises the steps of foaming a mixture of a foamable resin and a metallic powder to produce a first foamed resin-metal material of preselected density, partially curing the resin of the first foamed material, adding to the partially cured first foamed material an additional mixture of a foamable resin and a metallic powder, foaming the additional mixture in contact with the partially cured first foamed material to produce a second foamed material interbonded with the first foamed material and of density different from that first foamed and then curing at a temperature above the decomposition temperature of the resins and below the melting point of the lowest-to-melt metal powder in the interbonded foam to remove all organic materials, to sinter the powders and to further interbond the first and second foamed materials into a continuous foamed metallic material.

Using the method of this invention, foam materials have been made having a high density surface skin and a relatively low density, light weight body portion. Such a foam system combines the desirable properties of good erosion resistance contributed by the heavy skin with a low unit weight contributed by the low density body. Similarly, sandwich structures including two or more high density outer surfaces and low density inner body portions can be formed as can a large variety of multilayer structures of any desired variation in density.

A number of methods for making a foamed metal have been reported. These include U.S. Patent 2,917,384—Grandey, co-pending application Ser. No. 856,900, filed Dec. 3, 1959; and application Ser. No. 550,178—Albers et al. filed Nov. 30, 1955 all of which are assigned to the assignee of this application.

A variety of combinations of materials and densities involving the use of different powders such as of metal oxides and other metal compounds as well as metals can be produced in a foam article through the method of this invention.

Example 1

Clean, unoxidized 99% nickel powder of —325 mesh size was mixed with a 100% solids foamable silicone resin of the methyl phenyl silane type and a commercial bridged cyanidine foaming agent, an example of which is shown in the U.S. Patent 2,917,384 to Grandey. The following proportions by weight were used:

| | Parts |
|---|---|
| Nickel powder | 422 |
| Silicone resin | 110 |
| Foaming agent | 5 |

The intimately mixed powders were then placed in a rectangular confining adjustable mold and heated at 400° F. for 1 hour to polymerize the resin and to decompose the foaming agent bringing about the formation of a partially cured foamed resin-metal body.

The confining mold was then adjusted to increase its height and to allow additional material to be added. A more dense and stronger foamable material of the following proportions by weight was then added to the top of the first foamed resin-metal body:

| | Parts |
|---|---|
| Nickel powder | 844 |
| Silicone resin | 110 |
| Foaming agent | 5 |

The mold was then closed and was heated at 400° F. for 1 hour to polymerize the additional mix and to decompose the foaming agent added bringing about the formation of a second foamed metal-resin portion integrally bonded with the first foamed resin-metal portion. The density of the first foamed portion was 75–80 pounds per cubic foot whereas the density of the second foamed portion was 155 pounds per cubic foot.

The composite body of variable density laminations was then removed from the mold and placed in a retort at 800° F. containing a hydrogen atmosphere of —100° F. dew point at a flow rate of 50 cubic feet per hour. The temperature in the retort was slowly increased to 1200° F. over a period of about 3 hours and held at 1200° F. for 1½ hours to 2 hours to burn off and remove all organic matter including all resin and all foaming agent. The end of the burning off period was indicated by the absence of all yellow color in the flame of the hydrogen being burned off at a retort exit. When this point was reached, the retort temperature was slowly increased to 2125° F. and held there about 3 hours to bring about fusion of the metal in the cell walls of the foam. After the fusion period, the temperature was allowed to fall to 750° before the foamed article was removed from hydrogen atmosphere retort.

The article thus formed consisted of a first portion of a low density material and a second portion of a higher density material. The two portions had been integrally bonded in the partially cured or "green" state and were further interbonded in the stabilization process involving heating above the decomposition temperature of the organic ingredients but below the melting point of the nickel powder.

Although in this example the variation in density was obtained by adding to the partially cured first material a second material of different composition, the same variation in density can be achieved in the final product by adding the same composition a second time but adjusting the confining mold to prohibit full expansion during foaming of the additionally added material. In this way a more dense second resin-metal portion can be made.

*Example II*

An interbonded metal foam having portions of different metals can be made by following the method of Example I but using different metal or metal alloy powders and, if desirable, different foamable resins as follows:

First foamed material, by weight:

| | Parts |
|---|---|
| Nickel powder, —325 mesh | 422 |
| Alkyd resin | 110 |
| Foaming agent | 5 |

Second foamed material by weight:

| | Parts |
|---|---|
| Iron powder, —325 mesh | 422 |
| Silicone resin | 110 |
| Foaming agent | 4 |

The sintering temperature in this case is about 2150° F.

*Example III*

A material including a plurality of interbonded metallic laminae can be made by first separately mixing, foaming and optionally partially curing a plurality of foamed resin-metal materials. The plurality of these materials are secured in intimate contact and then are interbonded by heating above the decomposition temperature of the resin but below the melting point of the lowest-to-melt metal powder in the laminated foam. For example, the two types of foamable materials in Example I were foamed in separate molds and were heated at 400° F. for one hour to polymerize the resins and to decompose the foaming agent bringing about the formation of two separately partially cured foam resin-material bodies. These two were placed one on top of the other and held in firm contact by clamping between two flat plates. This system was placed in a forced convection oven operating at about 400° F. for 30 minutes. Upon removal from the furnace, the flat plates were removed and the laminated, interbonded structure was heat treated in a hydrogen atmosphere retort in the same manner as was described for the interbonded laminated material in Example I. In the case of some materials having relatively large openings, it is sometimes desirable to place a small amount of foamable resin at the interface between the "green" bodies prior to their being secured together in order to provide a more intimate contact and subsequently better interbonding.

Although this invention has been described in connection with specific examples, these are to be construed as illustrations of rather than limitations on this invention which is capable of modifications and variations as those skilled in the art will readily understand.

What is claimed is:
1. A method of making a metal foam of interbonded laminae comprising the steps of foaming a mixture of a foamable resin and metallic powder to produce a first foamed resin-metal material of preselected density; heating the first foamed material below the decomposition temperature of the resin to partially cure the resin of the first foamed material; adding to the partially cured first foamed material an additional mixture of a foamable resin and metallic powder; foaming the additional mixture in contact with the partially cured first foamed material to produce a second foamed material interbonded with the first foamed material and of density different from that of the first foamed material; and then heating the interbonded first and second foamed materials at a temperature above the decomposition temperature of the resins and below the melting point of the lowest-to-melt metal in the interbonded foam to remove all organic materials, to sinter the powders and to further interbond the first and second foamed materials into a continous foamed metallic material.

2. A method of making a metal foam of interbonded laminae comprising the steps of mixing a foamable resin and a metallic powder, foaming the resin-metal mix; heating the foamed mix at about 400° F. for one hour to partially cure the foamed resin-metal material; adding to the first foamed partially cured resin-metal material an additional mixture of a metal powder and a foamable resin; foaming the additional resin-metal mixture in contact with the first foamed partially cured resin-metal material to produce a composite resin-metal material; heating the composite material at about 400° F. for about one hour to partially cure the second foamed resin-metal portion of the composite material; heating the composite material in a reducing atmosphere at about 1200° F. for a time sufficient to remove the organic materials in the composite material and to partially sinter the metal powders; and then heating the composite material at a temperature sufficient to sinter the metal powders.

3. In a method of making a metal foam of interbonded laminae, the steps of separately foaming a plurality of mixtures of a foamable resin and a metallic powder to produce a plurality of foamed resin-metal materials; placing an uncured, unfoamed resin between the plurality of foamed resin-metal materials; securing the plurality of resin-metal foamed materials in intimate contact through the uncured, unfoamed resin to form a laminated composite; heating the laminated composite below the decomposition temperature of the resins to partially cure the uncured, unfoamed resin and to interbond the plurality of foamed resin-metal materials into an interbonded laminated material; and then heating the interbonded laminated material above the decomposition temperature of the resins and below the melting point of the lowest-to-melt metal powder in the laminated material to remove all organic materials, to sinter the powder and to further interbond the laminae into a continuous foamed metallic material.

References Cited

UNITED STATES PATENTS

| 2,251,410 | 4/1939 | Koehring | 75—221 |
| 2,267,918 | 3/1940 | Hildabolt | 75—222 |
| 2,917,384 | 12/1959 | Grandey | 75—222 |
| 3,052,967 | 11/1962 | Fischer | 75—222 |
| 3,078,552 | 2/1963 | Grandey | 75—222 |

FOREIGN PATENTS

| 339,645 | 2/1930 | Great Britain. |
| 369,964 | 3/1932 | Great Britain. |
| 468,518 | 7/1937 | Great Britain. |
| 544,969 | 5/1942 | Great Britain. |

CARL D. QUARFORTH, *Primary Examiner.*

BENJAMIN R. PADGETT, *Examiner.*

A. J. STEINER, *Assistant Examiner.*